Feb. 7, 1956 C. D. CHRISTIE 2,733,795
POWER TRANSMITTING CLUTCH MECHANISM
Filed Nov. 18, 1950 4 Sheets-Sheet 1
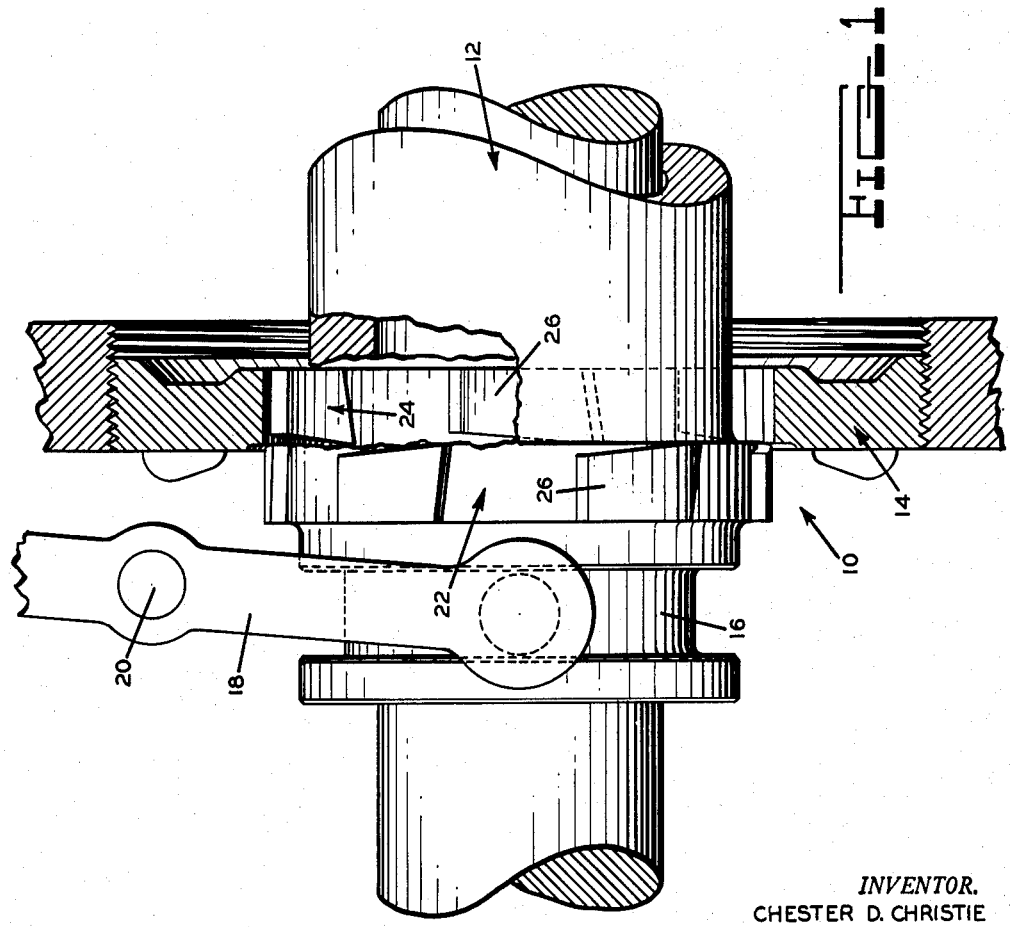
INVENTOR.
CHESTER D. CHRISTIE
BY
ATTORNEYS

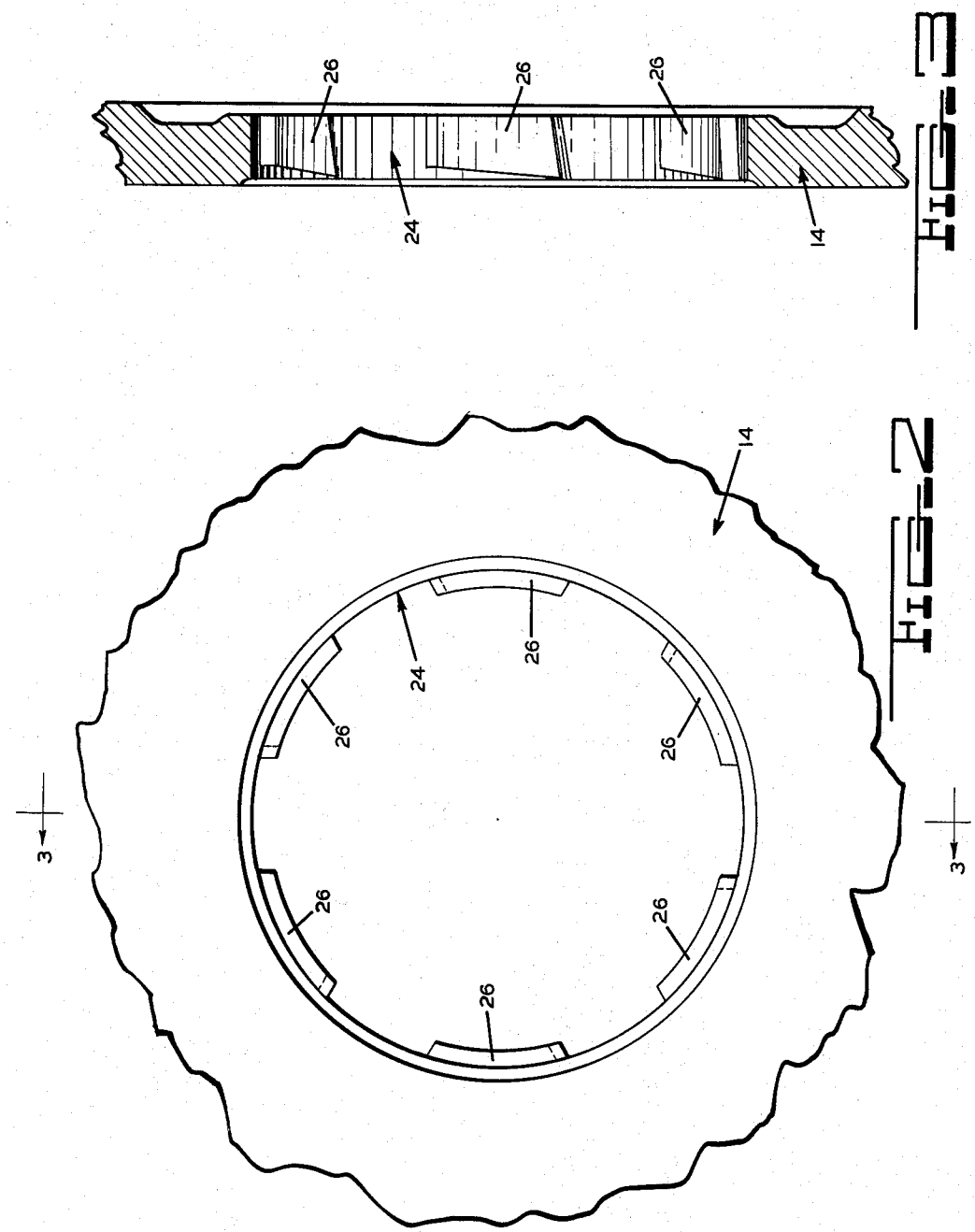

Feb. 7, 1956
C. D. CHRISTIE
2,733,795
POWER TRANSMITTING CLUTCH MECHANISM
Filed Nov. 18, 1950
4 Sheets-Sheet 3
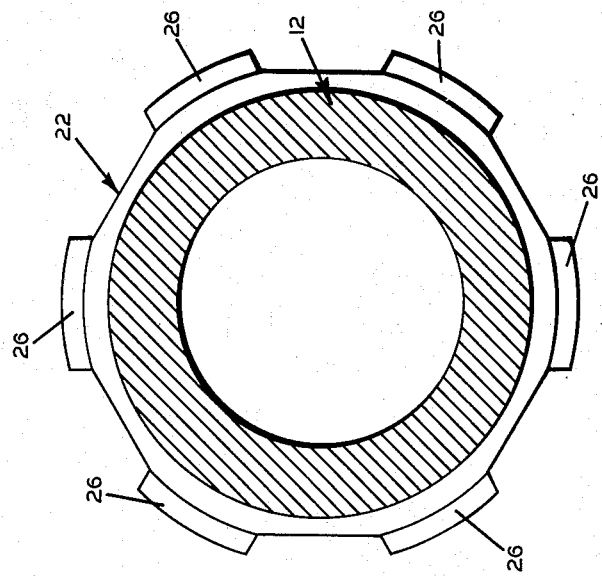
Fig- 9 -
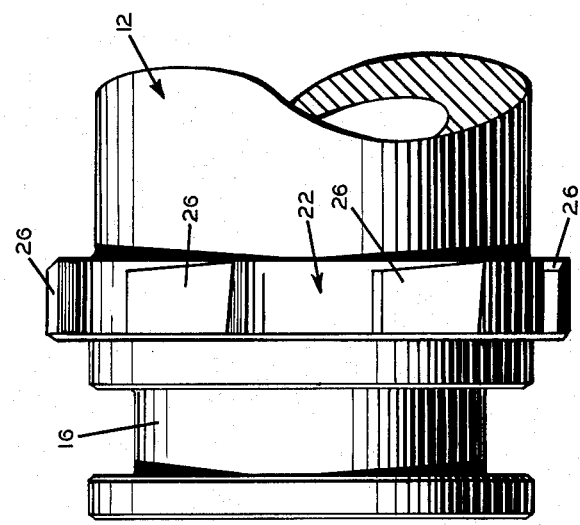
Fig- 4 -
INVENTOR.
CHESTER D. CHRISTIE
BY
McDonald & Teagno
ATTORNEYS Feb. 7, 1956  C. D. CHRISTIE  2,733,795
POWER TRANSMITTING CLUTCH MECHANISM
Filed Nov. 18, 1950  4 Sheets-Sheet 4
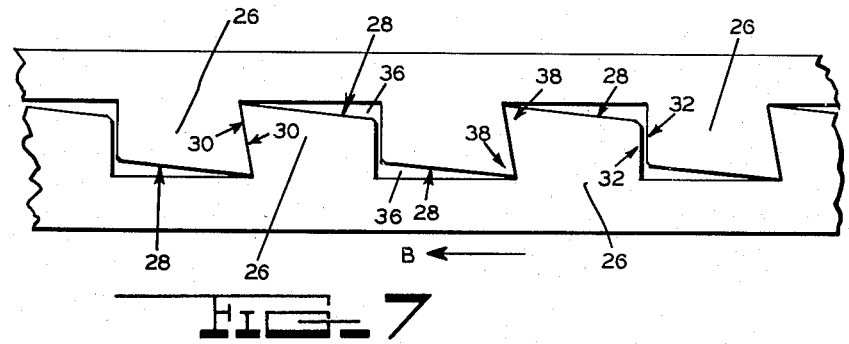
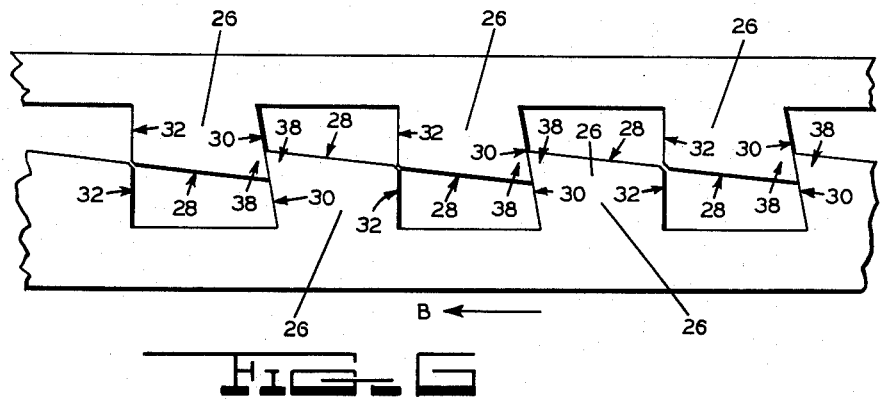
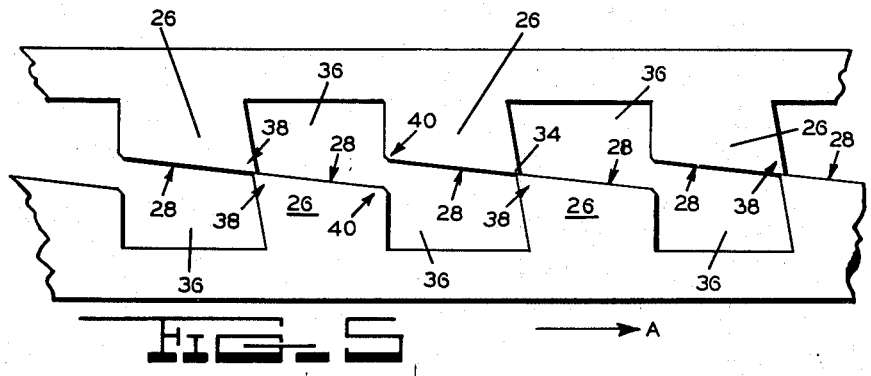
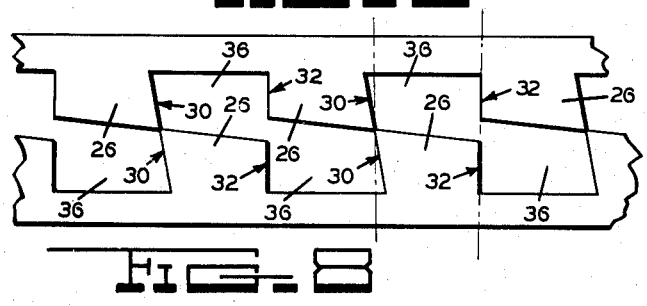
INVENTOR.
CHESTER D. CHRISTIE
BY
ATTORNEYS

2,733,795
POWER TRANSMITTING CLUTCH MECHANISM

Chester D. Christie, Beachwood Village, Ohio, assignor to Eaton Manufacturing Company, Cleveland, Ohio, a corporation of Ohio Application November 18, 1950, Serial No. 196,491

4 Claims. (Cl. 192—67)

This invention relates to power transmitting mechanisms and more particularly to clutching gear elements therefor.

Broadly, the invention comprehends the provision of clutching or braking gear mechanism wherein the engageable gear teeth of respective clutch gear members are each provided with mating inclined front faces and mating inclined side faces and with zero clearance or overlap therebetween such that engagement of the gears upon relative rotation in one direction is prevented whereas engagement occurs therebetween at the slightest reversal in relative rotation.

Although numerous clutching gear mechanisms have been devised none have heretofore positively prevented engagement between the respective clutching gear members thereof for either relative rotation in one direction or at zero relative speed therebetween such as is assured by the present mechanism.

Among the objects of the invention is the provision of a clutching gear mechanism of novel structure and gear tooth form that is relatively quiet and smooth in operation compared to presently utilized gear mechanisms of a like nature that operates with less wear than presently used mechanisms through the elimination of severe clashing between the trailing edges of the mating teeth on the engageable gear elements of the mechanism, that prevents clutching engagement between the elements thereof during relative rotation in one direction and at zero relative speed between the members when a provision is made for overlap relation between the front faces of the gear teeth on one member and the entrance passages between the gear teeth on the other member, yet encourage engagement at the slightest reversal in relative direction of rotation between the members and that prevents clutching engagement between the members thereof during relative rotation in one direction between the members when zero clearance or no overlap provision is made between the front faces of the gear teeth on the one member and the entrance passages between the gear teeth on the other member yet permit of possible engagement at zero relative speed in relative direction of rotation between the members.

Other objects and advantages of the invention will appear from the following description taken in connection with the drawings forming a part of the specification, and in which:

Fig. 1 is a partial elevation and a partial cross-sectional view of a clutching gear mechanism embodying the invention;

Fig. 2 is an end elevation view of a clutching or braking gear plate of the mechanism of Fig. 1;

Fig. 3 is a cross-section view taken substantially along lines 3—3 of Fig. 2;

Fig. 4 is a side elevation view of the clutching gear member of the mechanism of Fig. 1;

Figs. 5 through 7 are diagrammatic illustrations showing the shapes and comparative sizes of mating gear teeth and spaces therebetween as on a development of the circumference of the mechanism of Fig. 1 in different positions of engagement as relates to the relative direction of rotation therebetween;

Fig. 8 is a diagrammatic illustration of a modified form of mating gear teeth; and Fig. 9 is an end elevation view of Fig. 4.

Similar reference characters indicate corresponding parts throughout the several views of the drawings.

The presently devised clutching or braking gear elements of power transmission mechanisms are directed at the provision of clutch gear teeth, of a clutching or braking gear element, of specific related shape and size to one another and the spaces between teeth that when mated with a similarly constructed clutching or braking gear element, depending on the desired controllable use thereof, a positive inhibition of locking engagement is assured therebetween for one direction of relative rotation between the elements whereas locking engagement therebetween is encouraged when the slightest reversal of relative rotation occurs between the elements. It is possible to permit locking engagement between the elements at synchronization or zero relative speeds between the elements by providing no overlap or zero clearance for the entry of the respective teeth on one element into the spaces between the teeth on the other element when the elements are moved directly axially toward one another. Under conditions where overlap is provided the teeth can not move axially directly into engagement with one another and can only do so upon a reversal of relative rotation between the elements as compared to the direction of relative rotation between the elements positively inhibiting locking engagement therebetween. The teeth of the gear elements, in addition to being inclined on their front faces in the same direction as has been customary with gear elements of this type, have one inclined side face, that is the inclination provides for an increase in the width of the opening or spaces between the teeth from the crest to the base thereof with a converse greater width of the teeth at the crest than at the base. When in locked engagement the inclined side faces of the teeth become engaged and either a reaction or driving force is provided therebetween depending on whether the mechanism to which applied is utilized in a braking or clutching operation between the elements.

Aside from achieving a desired controlled condition of operation between the mating gear elements severe clashing between the trailing edges or corners of the mating teeth in a unidirectional blocking phase of operation of the mechanism is eliminated resulting in a reasonably quiet and smooth operation therebetween as well as assuring a prolonged life thereof.

Referring to the drawings for more specific details thereof 10 represents generally a clutching or braking gear mechanism comprising a shiftable or sliding clutching gear element 12 adapted under certain prescribed operating conditions to have locking engagement with a clutching gear element or plate 14.

The sliding element 12 is provided with an annular yoke receiving portion 16 within which an appropriate yoke 18 is received effective through the pivotal action of the yoke about its pivot anchor 20 to shift the element 12 axially as desired for clutching or braking engagement with the plate 14. The element 12 has an external clutching gear 22 integral therewith of specific design, to be hereinafter defined, for locking engagement with an internal clutching or braking gear 24 of like design as gear 22.

Whereas either one or both of the gears 22 and 24 may have driving or driven relation with gearing, shafts or the like such that either a braking or clutching locking engagement is attained upon mating relation between the gears thereof the illustration of Fig. 1 shows the plate 14 as a stationary member and element 12 as both a sliding and permissibly rotatable member.

The teeth 26 of gears 22 and 24 as shown in circumferential development by Figs. 5 through 7 are of like configuration wherein each tooth has an inclined front face 28 of predetermined angularity, the angle of which is determined by the lift desired when the gears are not synchronized. In addition to the inclination of the front face of each gear tooth, one side face 30 of each tooth is inclined away from a plane passing through the axis of the gear, said inclination being on the side of the tooth at its greatest axial length or height. With the tooth being inclined on one side face 30 and having its other side face 32 lying in a plane passing through the axis of the gear, the tooth has a greater circumferential width at its crest than at its base, wherein the side face 30 of the tooth converges from the crest to the base thereof in relation to side face 32, the purpose of which will hereinafter appear. The angle of inclination on the side face of each tooth is determined upon the desired backlash when the gears are engaged, the clearance at the point of engagement and desired amount of overlap.

The overlap 34 shown by Fig. 5 to be provided between the teeth on the engageable gears is determined by making the tooth of such circumferential width at its crest and the openings or spaces 36 of such width between the crests of adjacent teeth that upon direct axial movement of the gear elements toward one another the peak front face portion of the crest on one tooth of one gear will abut the peak front face portion of a tooth on the other gear. This overlap condition must be regulated as to maximum amount so that when the respective front faces are slid one upon the other in the relative direction of rotation for the locking engagement of the gears 22 and 24 of the elements 12 and 14, the width along the inclined face of the tooth is equal to or less than the width of the opening, between the teeth on the mating gear, lying in a plane of the front face of the tooth that the tooth of the other member slides across in moving to a position for entry between the teeth. It is to be noted in view of the arrangement of the teeth of each gear in circumferentially spaced array that the openings or spaces 36 of one gear element are complementary to the teeth of the gear on the other gear element for the appropriate reception therein of said gear teeth in accordance with the predetermined established mode of operation to occur between the elements.

If no overlap or zero clearance as shown by Fig. 8 is provided between the entrance of the openings and the width of the tooth to be received therein, a condition of synchronization or zero relative speed between the elements could permit of a locking engagement between the elements, that is one gear could be moved directly axially into engagement with the other gear, but would be capable of positively inhibiting locking engagement under one predetermined condition of relative rotation therebetween.

With reference to Fig. 5, assuming that element 14 is held stationary and the element 12 is rotated in the direction of arrow A, any attempt to cause axial movement of the element 12 toward engagement of gear 22 upon gear 24 will result in the front faces of the gears riding up one upon the other such that as the peak portions 38 of the front faces of the mating teeth pass over each other the relativity of motion between elements 12 and 14 prevents the gears from moving axially into engagement whether or not an overlap 34 is provided since by the time the gears are moved axially the relative motion therebetween assumes a sliding of the short height portions 40 of the front faces of the gear teeth upon one another.

Fig. 6 illustrates the condition of locking engagement between the gears 22 and 24 of elements 12 and 14 wherein the element 12 has reversed its direction of rotation relative to element 14 the front faces of the gear teeth of element 12 slide axially inwardly upon the front faces of the gear teeth of element 14 whereupon as the face portions 40 of the gear teeth slide past each other the side faces of the teeth have come into engagement and through the provision of the teeth having a frontal face length equal to or less than the entrance opening between the side faces 30 and 32 of adjacent teeth on the gear of element 14 taken along the plane of inclination of the front face of the teeth of the gear of element 14.

Fig. 7 illustrates the final locking engagement relation between the elements 12 and 14 wherein the inclined side faces 30 are in reaction bearing relation to one another wherein because of the stationary relation of element 14 the element 12 is inhibited from rotation until such time as it is once again shifted axially out of engagement with element 14.

It is to be noted in viewing the amount of overlap 34 provided between the teeth of the gear elements 12 and 14 as shown by Fig. 5, that the side faces 32 of the teeth lie in a common plane and that therefore no amount of axial movement will provide engagement between the teeth of the gear elements even if the elements are operating at synchronization or zero relative speed. At the same time it will be immediately apparent that by diminishing the overlap to zero such as shown in Fig. 8, it will be possible to effect an engagement between the gears at synchronization.

Through the provision of a positive overlap it is self evident that as the front faces of the teeth of gear element 12 move over the front faces of the teeth of gear element 14 no clashing or grabbing of low height portion 40 corners of the front faces adjacent side faces 32 will occur thereby permitting of a smoother and quieter operation of the elements relative to one another when in uni-directional blocking condition of operation which in turn assures longer effective operating life thereof.

Although the gear elements have been disclosed with respect to one specific form of structural embodiment and application they are susceptible of numerous structural changes and applications without departing from the basic fundamentals of structure and operation akin thereto and are therefore to be limited solely by the scope of the appended claims wherein the terms "clutch or clutching" are to be interpreted in the all embracing definition to also include brake or braking.

What I claim is:

1. A clutching mechanism comprising a pair of engageable cylindrical clutching elements, each having a plurality of equi-spaced gear teeth, said teeth each having front faces inclined to a plane perpendicular to the axis of the mechanism providing for mating relation between the front faces of the teeth of the respective clutching elements along common planes, a side face lying substantially in a plane passing through the axis of the clutching mechanism, and a side face inclined to a plane passing through the axis of the clutching mechanism adjoining the front face of the tooth at the point of greatest axial length thereof providing for a greater width of the tooth at its front face than at its base, said teeth being provided of such width at the front faces thereof and the spaces between the teeth at the front face positions thereof being provided of such width that the teeth on one clutching element cannot enter into the spaces between the teeth on the other clutching element upon a relative direct axial movement of the clutching element toward one another with no relative rotation existing between the clutching elements and also that the teeth on one clutching element cannot enter into the spaces between the teeth on the other clutching element for one direction of relative rotation between the cooperative clutching elements while permitting movement of the teeth of the cooperative clutching elements to enter the spaces between the teeth of the cooperative clutching elements for a reverse direction of relative rotation therebetween, said teeth of both clutching elements being identical in size and shape and the spaces between the teeth on both clutching elements being identical in size and shape.

2. A mechanism according to claim 1 wherein the spaces between each first side face and each inclined side face lying in a plane of the inclined surfaces of the teeth are of a width equal to or slightly greater than the width of the teeth along the inclined front faces thereof.

3. A mechanism according to claim 1 wherein the front face portions of the teeth thereof are of such width that with the side faces of the teeth lying in a plane passing through the axis of the clutching mechanism being arranged in a plane common said side faces of both clutching elements, the front face portions of the teeth on the respective clutch elements will be in overlapping mating relation adjoining the inclined side faces thereof adjacent the greatest axial length of the teeth.

4. A mechanism according to claim 3 wherein the spaces are of slightly greater width throughout their axial length than the teeth adapted to be received therein are throughout their axial length.

References Cited in the file of this patent

UNITED STATES PATENTS

| | | |
|---|---|---|
| 1,163,085 | Hardy | Dec. 7, 1915 |
| 1,515,100 | Foster | Nov. 11, 1924 |
| 2,049,126 | Mayback | July 28, 1936 |
| 2,180,597 | LeBus | Nov. 21, 1939 |
| 2,218,398 | Jameson | Oct. 15, 1940 |
| 2,499,954 | Hook | Mar. 7, 1950 |